United States Patent [19]

Schapira et al.

[11] Patent Number: 5,330,659

[45] Date of Patent: Jul. 19, 1994

[54] PROCESS FOR DENATURATING WATER-DILUTABLE PAINTS AND SOLVENT-BASED PAINTS AND DENATURATION SOLUTION USED IN THIS PROCESS

[75] Inventors: Joseph Schapira, Paris; Patrick Droniou, Colombes; Michel Sudour, Luzarches; Véronique Lerouge née Bouaffree, Bois Colombes, all of France

[73] Assignee: C F P I, France

[21] Appl. No.: 921,802

[22] Filed: Jul. 30, 1992

[30] Foreign Application Priority Data

Aug. 2, 1991 [FR] France .................. 91 09914

[51] Int. Cl.$^5$ ................ C02F 1/56
[52] U.S. Cl. ............. 210/725; 210/728; 210/729; 210/764; 210/930; 134/38; 95/206
[58] Field of Search ......... 55/85; 210/712, 725, 210/728, 727, 729, 734, 930, 764; 134/38; 427/331

[56] References Cited

U.S. PATENT DOCUMENTS

| | | | |
|---|---|---|---|
| 3,723,148 | 3/1973 | Tupper | 210/930 |
| 4,055,495 | 10/1977 | Gabel et al. | 210/930 |
| 4,146,473 | 3/1979 | Edelmann et al. | 209/5 |
| 4,185,970 | 1/1980 | Dean | 210/930 |
| 4,440,647 | 4/1984 | Puchalski | 210/712 |
| 4,656,059 | 4/1987 | Mizuno et al. | 210/735 |
| 4,661,527 | 4/1987 | Seng | 210/930 |
| 4,933,091 | 6/1990 | Geke et al. | 210/930 |

FOREIGN PATENT DOCUMENTS

| | | |
|---|---|---|
| 679639 | 4/1966 | Belgium . |
| 0526339 | 2/1993 | European Pat. Off. ........... 210/930 |
| 2030922 | 12/1969 | France . |
| 62-68506 | 3/1987 | Japan .................. 210/930 |

*Primary Examiner*—Peter A. Hruskoci
*Attorney, Agent, or Firm*—Larson and Taylor

[57] ABSTRACT

Process for denaturating water-dilutable paints and solvent-based paints, wherein said paints are treated by washing with the assistance of an aqueous denaturation phase whose pH is from 4.5 to 7 and preferably from 5 to 6 and which contains an effective quantity of at least one denaturation agent consisting of an amine molecule of formula

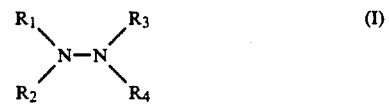

(I)

or of formula:

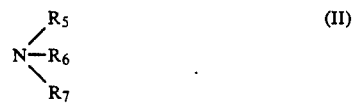

(II)

in which the substituents $R_1$ to $R_7$, which may be identical or different, represent:
 a hydrogen atom,
 a radical of formula —O—Re in which Re is chosen from the group comprising hydrogen and a $C_1$ to $C_4$ saturated aliphatic hydrocarbon chain, it being understood that the substituents $R_5$ to $R_7$ are not simultaneously all hydrogen atoms, or of a hydrate or else of a salt of an organic or inorganic acid salt of said amine molecule, preferably a salt of sulfuric acid, phosphoric acid or hydrochloric acid.

12 Claims, No Drawings

PROCESS FOR DENATURATING WATER-DILUTABLE PAINTS AND SOLVENT-BASED PAINTS AND DENATURATION SOLUTION USED IN THIS PROCESS

The invention relates to a process for denaturating water-dilutable paints and solvent-based paints which are recovered in spray booths.

It also relates to the denaturation solution used in said process and the concentrate from which said solution is prepared by dilution with the required amount of water.

Paints or lacquers in the form of solutions or of suspensions in a solvent are applied on an industrial scale in most cases in a room, called a spray booth, which is specially designed to avoid the discharge of excess material into the atmosphere, in order to respect the protection of workers and of the environment.

The application of the paints or lacquers on the objects to be coated takes place in the form of fine dispersions obtained by means of nozzles.

In the automobile industry, paints or lacquers are deposited in successive layers each of which has its own characteristics.

After application of a first layer by dipping under current, the subsequent priming, finishing, and, if appropriate, varnishing layers are applied by means of a spray gun. While the first layer, owing to its mode of application, does not lead to any specific problem regarding excess material, the application of the following layers by spray gun means that a not inconsiderable quantity of the paint solution fails to reach the substrate to be treated.

This is the reason why, in practice, pulverization is carried out inside a booth in which the air, loaded with paint droplets, is sucked through a liquid screen washing device, the droplets remaining in the liquid and the air emerging being thus decontaminated.

The liquid loaded with the product composing the paint droplets flows into a collecting pan; it is in turn treated in order to separate the paint phase, which is discharged, from the aqueous phase, which is recycled to the liquid screen washing device, this being done within the framework of the legislation on effluent discharge and for reasons of operational cost-effectiveness.

To make it possible to separate the paint phase from the waters resulting from the washing process, it is known to incorporate in this water denaturation and/or flocculation/decantation additives; as a result of a physico-chemical reaction of the paint, the latter forms, once denaturated and according to the design of the denaturation system, an upper or lower phase or, at the same time, an upper and lower phase.

The upper phase is generally eliminated by overflowing and/or shaving of the surface and the lower phase by drawing off in the lower part of the denaturation tank.

Depending on the design of the processing installation, it may be advantageous to denaturate the paint in order to produce only an upper paint phase on a lower aqueous phase, the upper paint phase requiring for its separation no pumping means, but only a mechanical shaving.

A denaturation carried out in this way may require a very bulky installation and it may be more advantageous, in case of space limitations, to operate by decantation of a lower paint phase on an upper aqueous phase.

A pumping operation may then turn out to be necessary.

It is known to use as denaturation additives to be added to the paint washing waters alkaline powders or liquids which are corrosive and dangerous to handle.

These products may contain, besides alkaline products, inorganic products such as bentonite or clays which take away the tackiness of paints and promote their dispersion. Alternatively, they may contain trivalent ion salts which promote the coagulation of suspensions.

The known compositions based on alkaline powders or liquids and inorganic products lead to satisfactory denaturations as long as conventional paints, in particular solvent-based paints having a high dry solids content are involved.

To take into account the increasing constraints with respect to the limitation of organic solvent discharges in the atmosphere, new types of paints have been developed, whose composition is different from conventional paints.

These are the water-dilutable paints.

When attempting to denaturate the latter with conventional means, it is observed that only a low proportion of the paint comes to the surface while the bulk of the latter is diluted in the washing waters, leading thus to rapid contamination of the bath, and hence to the necessity for frequent drainage operations.

To remedy this state of affairs, it has already been suggested to use trivalent metallic salts such as, for example, aluminum sulfate while maintaining the pH of the denaturation solution at a value lower than 4; the results recorded under these conditions are acceptable; however, maintaining a pH in the vicinity of or lower than 4 is difficult to apply on an industrial scale, for reasons of corrosion in particular in the case of concrete flocculation cisterns; and as soon as the pH goes up to a value in the vicinity of 5, the results deteriorate, be it from the point of view of the denaturation of the paint or of the passing into solution of the pigments.

The aim of the invention is therefore above all to remedy the disadvantages of the prior art and to provide a process and a solution which make it possible to denaturate water-dilutable paints under satisfactory conditions.

The Applicant Company has the merit of having found, in a surprising and unexpected way, that this aim can be achieved if at least one denaturation agent chosen from a group of particular amine molecules to be discussed below is used in said process and denaturation solution, these molecules making it moreover possible, in an equally surprising and unexpected way, to denaturate solvent-based paints as well.

It follows that the process according to the invention for denaturating water-soluble paints and solvent-based paints is characterized by the fact that said paints are treated by washing with the assistance of an aqueous denaturation phase whose pH is from 4.5 to 7 and preferably from 5 to 6 and which contains an effective quantity of at least one denaturation agent consisting of an amine molecule of formula

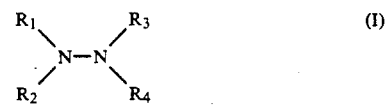

or of formula:

(II)

in which the substituents $R_1$ to $R_7$, which may be identical or different, denote:
a hydrogen atom,
a radical of formula —O—Re in which Re is chosen from the group comprising hydrogen and a $C_1$ to $C_4$ saturated aliphatic hydrocarbon chain, it being understood that the substituents $R_5$ to $R_7$ are not simultaneously all hydrogen atoms,
or of a hydrate or else of an organic or inorganic acid salt of said amine molecule, preferably a salt of sulfuric acid, phosphoric acid or hydrochloric acid.

The solution for denaturating water-dilutable paints and solvent-based paints according to the invention is characterized by the fact that it contains an effective quantity of at least one denaturation agent consisting of an amine molecule of formula

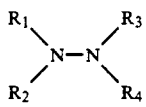
(I)

or of formula:

(II)

in which the substituents $R_1$ to $R_7$, which may be identical or different, denote:
a hydrogen atom,
a radical of formula —O—Re in which Re is chosen from the group comprising hydrogen and a $C_1$ to $C_4$ saturated aliphatic hydrocarbon chain, it being understood that the substituents $R_5$ to $R_7$ are not simultaneously all hydrogen atoms, or
of a hydrate or else of an organic or inorganic acid salt of said amine molecule, preferably a salt of sulfuric acid, phosphoric acid or hydrochloric acid.

The concentrate according to the invention is in the form of a solution comprising a proportion of 5 to 50% by weight of at least one denaturation agent consisting of an amine molecule of formula

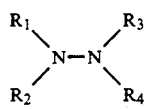
(I)

or of formula:

(II)

in which the substituents $R_1$ to $R_7$, which may be identical or different, denote:
a hydrogen atom,
a radical of formula —O—Re in which Re is chosen from the group comprising hydrogen and a $C_1$ to $C_4$ saturated aliphatic hydrocarbon chain, it being understood that the substituents $R_5$ to $R_7$ are not simultaneously all hydrogen atoms,
or of a hydrate or else of an organic or inorganic acid salt of said amine molecule, preferably a salt of sulfuric acid, phosphoric acid or hydrochloric acid.

The invention also relates to the use of amine molecules of formula I and II as agents for denaturating water-dilutable paints and solvent-based paints.

Advantageously, said denaturation agent is chosen from the group comprising in particular hydrazine, its hydrate and its chloride, the alkoxyamines and more particularly hydroxylamine, as well as the sulfate, phosphate and hydrochloride thereof.

Preferably, the concentration of the aqueous denaturation solution in at least one of the denaturation agents of formula I or II or in at least one of their hydrates or organic or inorganic acid salts is between 0.1 and 50 g/l, preferably between 1 and 6 g/l.

The fact that the denaturation agent according to the invention makes it possible to treat not only water-dilutable paints but also solvent-based paints such as, for example, lacquers and varnishes, is particularly advantageous, given that different types of paints are very frequently collected in the same denaturation pit; as a result, an agent which would be suitable only for water-dilutable paints could not be used on an industrial scale.

According to one advantageous embodiment, the denaturation solution according to the invention comprises additional denaturation agents and/or antifoaming agents and/or microbicidal agents.

According to another advantageous embodiment, the concentrate according to the invention contains additional denaturation agents and/or antifoaming agents and/or antimicrobicidal agents.

The additional denaturation agents may be chosen from the group comprising the conventional polyelectrolytes (nonionic, anionic, cationic) and solutions of salts of trivalent metals such as aluminum and iron[III].

The antifoaming agents, which are advantageous since water-dilutable paints often generate more foam than the conventional, solvent-based paints, may be chosen from the group comprising oils of inorganic, vegetable or animal origin, lipophilic nonionic surfactants such as alcohols or alkylphenols containing propylene oxide, and the silicone-containing antifoaming agents.

The microbicidal agents may be chosen from the group comprising the precursors of formalin such as the triazines, the aldehydes such as glutaraldehyde, and the derivatives of isothiazalone such as the products marketed by the company RÖHM & HAAS under the name KATHON and based on 2-octyl-4-isothiazolin-3-one.

To bring the pH to the value chosen according to the invention, depending on the initial pH of the denaturation agent used, a sufficient quantity of at least one of the products of the group comprising sodium hydroxide, potassium hydroxide, the alkali metal carbonates or ammonia, the alkanolamines (in particular monoethanolamine, diethanolamine, triethanolamine), the phosphates such as trisodium and tripotassium phosphates, sodium pyrophosphate and tripolyphosphate and potassium pyrophosphate and tripolyphosphate, and sulfuric acid, hydrochloric acid, phosphoric acid and nitric acid may be used.

The pH can also be adjusted by using a mixture of two denaturation agents of formula I or II, one being an acid compound and the other an alkali compound; for instance a mixture of hydroxylamine sulfate and hydrazine hydrate can be used.

The pH can also be adjusted by using simultaneously several of the means mentioned above.

The nonlimitative examples which follow illustrate, in the case of the first three, advantageous embodiments of the invention, the fourth illustrating the results obtained with denaturation agents according to the prior art.

In these examples, an installation having a water screen and comprising a 30-liter tank equipped with a stirring device with circulation carried out by a pump. The denaturation solution forced back by this pump enters a first reserve tank from which it flows in a thin sheet of approximately 5 mm thickness on a surface of approximately 30 dm$^2$.

Having moved over said surface, the denaturation solution passes into a second reserve tank through a series of baffle plates alternately in a high, a low and a high position; the denaturated paint phase is thus separated by shaving. The aqueous phase is then sucked by the circulation pump to restart the cycle. The pump throughput is adjustable. It has been regulated for test purposes to approximately 300 liters per hour.

The denaturation agent subjected to testing is introduced into the baffle and, after homogenization of the bath, the paint is pulverized by means of a compressed air spray gun above the thin sheet of denaturation solution formed in the installation described above.

The denaturation agent degrades the paint which agglomerates on the first baffle.

The quantity of paint pulverized is in general 10 g in each test.

When separating the denaturated paint phase by decantation, the installation is modified by inverting the sequence of baffles, the first then being low, the second high, the third low and so forth. The degraded paint then agglomerates on the first baffle.

To quantify the quality of denaturation, a notational system taking into account three criteria was used.

The first criterion concerns the quality of the denaturation or "D" which is graded from 1 to 5 as follows:
1: Paint not denaturated; no modification in its appearance, complete passage into solution in the case of water-dilutable paints; no film on the surface.
2: Paint only slightly denaturated, tacky (in the case of solvent-based paints); formation of a discontinuous film on the surface which cannot be removed by shaving.
3: Paint moderately denaturated, only slightly tacky in the case of solvent-based paints; discontinuous film on the surface which can be eliminated by shaving.
4: Paint well denaturated, nontacky except in mixing (in the case of solvent-based paints); presence of agglomerates of a few grains only; film easily removed by shaving.
5: Paint perfectly denaturated, nontacky; continuous, compact film which is very easily eliminated by shaving.

The second criterion concerns the exudation E of the pigments (only in the case of water-dilutable paints—this problem does not exist in the case of solvent-based paints):
1: Complete passage into solution of the pigments; intense and rapid coloration of the bath.
2: Progressive passage into solution of the pigments; about 50% of the paint stays on the surface.
3: Very weak passage into solution; weak coloration of the washing waters; slight exudation of the pigments if the sludge is deposited on absorbent paper.
4: Slightly turbid bath; no exudation of the pigments if the sludge recovered is deposited on absorbent paper, but exudation of the pigments on mixing.
5: Perfectly clear bath, no exudation of the pigments in the sludges, be it on paper or during mixing.

The third criterion quantifies the percentage of paint which has settled or "S", expressed in %.

The paints which were subjected to denaturation testing are identified in Table I below.

TABLE I

| Type of paint | Supplier | Designation | Reference |
|---|---|---|---|
| Water-dilutable | BASF | Snow white | FQ 30029 F |
| | | Futura gray | FW 957695 |
| | | Red 727 | Code No. 5191001 |
| Water-dilutable | HERBERTS | White | 711004 |
| | | Futura gray | 712004 |
| Water-dilutable | IDAC | Snow white | EWT 921 1108 |
| | | Antique gray 129 | |
| | | Red 727 | |
| | | Andalusian red | |
| Solvent-based | IDAC | Vega green | 841 CJ 146 R |
| | | Varnish | RK 98531 R |
| Solvent-based | PPG | Priming Light gray | E 730 G 305/1 |

The tests were carried out as indicated above in using the installation described.

EXAMPLE 1

In a first test series, the three denaturation agents according to the invention identified below were tested:
hydrazine hydrate,
methoxylamine in the presence of TEA,
O-ethylhydroxylamine in the presence of TEA.

In Table II below, the composition and the pH of the three denaturation solutions obtained respectively from each of said denaturation agents are indicated and, for each denaturated paint, the values of D, E and S (water-dilutable paints) or the values of D and S (solvent-based paints) have been entered.

TABLE II

FLOCCULATION OF WATER-DILUTABLE/SOLVENT-BASED PAINTS
Tests of different amine derivatives

| | WATER-DILUTABLE | | | | | | | | | SOLVENT-BASED | | |
|---|---|---|---|---|---|---|---|---|---|---|---|---|
| PRODUCT | BASF | | | HERBERTS | | IDAC | | | | IDAC | | PPG |
| CONCEN-TRATION pH SOLUTION | Snow white | Futura gray | Red | White | Futura gray | White | Andalusian gray | Red 727 | Andalusian red | Vega green | Varnish | Priming light gray |
| Hydrazine hydrate 1 g/l + H$_2$SO$_4$ | D/E/S 4/3/0 | D/E/S 5/5/0 | D/E/S 4/3/0 | D/E/S 5/5/0 | D/E/S 3/3/0 | D/E/S 5/4/0 | D/E/S 4/4/0 | D/E/S 4/3/0 | D/E/S 4/3/0 | D/S 5/0 | D/S 3/0 | D/S 3/0 |

TABLE II-continued

FLOCCULATION OF WATER-DILUTABLE/SOLVENT-BASED PAINTS
Tests of different amine derivatives

| PRODUCT CONCENTRATION pH SOLUTION | WATER-DILUTABLE | | | | | | | | | SOLVENT-BASED | | |
|---|---|---|---|---|---|---|---|---|---|---|---|---|
| | BASF | | HERBERTS | | | IDAC | | | | IDAC | | PPG |
| | Snow white | Futura gray | Red | White | Futura gray | White | Andalusian gray | Red 727 | Andalusian red | Vega green | Varnish | Priming light gray |
| sufficient to take the pH of the bath to 6 Methoxylamine, HCl 2.5 g/l + TEA sufficient to take the pH of the bath to 5.5 | 5/4/0 | 5/4/0 | 4/3/0 | 5/5/0 | 3/2/0 | 5/4/0 | 5/5/0 | 4/3/0 | 4/3/0 | 5/0 | 3/0 | 1/0 |
| O-ethyl-hyroxyl-amine, HCl 5 g/l + TEA sufficient to take the pH of the bath to 5.8 | 5/4/0 | 5/5/0 | 5/4/0 | 5/5/0 | 5/5/0 | 5/4/0 | 5/5/0 | 4/3/0 | 4/3/0 | 5/0 | 4/0 | 2/0 |

TEA = triethanolamine

EXAMPLE 2

In a second test series, the following four denaturation agents according to the invention were tested:
  hydroxylamine sulfate or HAS,
  hydroxylamine sulfate combined with monoethanolamine or MEA,
  hydroxylamine sulfate combined with TEA,
  hydroxylamine sulfate combined with hydrazine hydrate.

In Table III below, the composition and pH of the four denaturation solutions obtained respectively from each of said denaturation agents are indicated and, for each denaturated paint, the values of D, E and S (water-dilutable paints) or the values of D and S (solvent-based paints) have been entered.

Said fourth denaturation solution illustrates the possibility of taking the pH to the value chosen by mixing two denaturation agents according to the invention.

TABLE III

FLOCCULATION OF WATER-DILUTABLE/SOLVENT-BASED PAINTS
Neutralizing agents of hydroxylamine sulfate (HAS)

| PRODUCT CONCENTRATION pH SOLUTION | WATER-DILUTABLE | | | | | | | | | SOLVENT-BASED | | |
|---|---|---|---|---|---|---|---|---|---|---|---|---|
| | BASF | | HERBERTS | | | IDAC | | | | IDAC | | PPG |
| | Snow white | Futura gray | Red | White | Futura gray | White | Andalusian gray | Red 727 | Andalusian red | Vega green | Varnish | Priming light gray |
| HAS 1 g/l pH of bath = 4.7 | D/E/S 4/4/0 | D/E/S 4/4/0 | D/E/S 3/3/0 | D/E/S 5/5/0 | D/E/S 4/3/0 | D/E/S 5/4/0 | D/E/S 4/3/0 | D/E/S 3/3/0 | D/E/S 3/3/0 | D/S 5/0 | D/S 5/0 | D/S 4/0 |
| HAS 5 g/l + MEA sufficient to take the pH of the bath to 6 | 5/5/0 | 5/5/0 | 5/4/0 | 5/5/0 | 4/3/0 | 5/4/0 | 5/4/0 | 4/4/0 | 4/4/0 | 5/0 | 5/0 | 4/0 |
| HAS 5 g/l + TEA sufficient to take the pH of the bath to 6 | 5/5/0 | 5/5/0 | 5/5/0 | 5/5/0 | 4/3/0 | 5/4/0 | 5/4/0 | 4/4/0 | 4/4/0 | 5/0 | 5/0 | 4/0 |
| HAS 5 g/l + hydrazine hydrate sufficient to take the pH of the bath to 6 | 5/5/0 | 5/5/0 | 5/5/0 | 5/5/0 | 4/3/0 | 5/4/0 | 5/4/0 | 4/4/0 | 4/4/0 | 5/0 | 5/0 | 4/0 |

MEA = monoethanolamine
TEA = triethanolamine

EXAMPLE 3

In a third test series, the three denaturation agents according to the invention identified below were tested:
  hydroxylamine O-sulfonate combined with TEA,
  hydroxylamine phosphate,
  hydroxylamine chloride combined with TEA.

In Table IV below, the composition and the pH of the four denaturation solutions obtained respectively from each of said denaturation agents are indicated and, for each denaturated paint, the values of D, E and S (water-dilutable paints) or the values of D and S (solvent-based paints) have been entered.

TABLE IV

FLOCCULATION OF WATER-DILUTABLE/SOLVENT-BASED PAINTS
Hydroxylamine salts

| | WATER-DILUTABLE | | | | | | | | | SOLVENT-BASED | | |
|---|---|---|---|---|---|---|---|---|---|---|---|---|
| PRODUCT | BASF | | | HERBERTS | | | IDAC | | | | IDAC | PPG |
| CONCEN-TRATION pH SOLUTION | Snow white | Futura gray | Red | White | Futura gray | White | Andalusian gray | Red 727 | Andalusian red | Vega green | Varnish | Priming light gray |
| Hydroxylamine O-sulfonate 5 g/l + TEA sufficient to take the pH of the bath to 5.6 | D/E/S 5/4/0 | D/E/S 5/5/0 | D/E/S 5/4/0 | D/E/S 5/5/0 | D/E/S 4/2/0 | D/E/S 5/4/0 | D/E/S 5/4/0 | D/E/S 4/3/0 | D/E/S 4/3/0 | D/S 5/0 | D/S 4/0 | D/S 1/0 |
| Hydroxylamine phosphate 5 g/l + $H_2SO_4$ sufficient to take the pH of the bath to 5.6 | 5/4/0 | 5/5/0 | 5/5/0 | 5/5/0 | 4/2/0 | 5/4/0 | 5/4/0 | 5/5/0 | 5/5/0 | 5/0 | 4/0 | 2/0 |
| Hydroxylamine, HCl 5 g/l + TEA sufficient to take the pH of the bath to 6 | 5/4/0 | 5/4/0 | 5/3/0 | 5/4/0 | 4/2/0 | 5/4/0 | 5/4/0 | 4/3/0 | 4/3/0 | 5/0 | 4/0 | 4/0 |

TEA = triethanolamine.

EXAMPLE 4

In a fourth test series, the three denaturation agents of the prior art identified below were tested:
- an alkaline product marketed under the brand name PROGAL P 131 R by the Applicant Company, composed essentially of potassium hydroxide,
- a product based on aluminum salts marketed under the brand name PROGAL P 215 R by the Applicant Company, composed essentially of aluminum sulfate and having an acid pH,
- a bentonite of brand name CLARSOL FGN-FR marketed by the company CECA and having a strength of essentially 60% of $SiO_2$ and 22% of $Al_2O_3$.

In Table V below, the composition and the pH of the four denaturation solutions obtained respectively from each of said denaturation agents are indicated and, for each denaturated paint, the values of D, E and S (water-dilutable paints) or the values of D and S (solvent-based paints) have been entered.

TABLE V

FLOCCULATION OF WATER-DILUTABLE/SOLVENT-BASED
Conventional flocculants

| | WATER-DILUTABLE | | | | | | | | | SOLVENT-BASED | | |
|---|---|---|---|---|---|---|---|---|---|---|---|---|
| PRODUCT | BASF | | | HERBERTS | | | IDAC | | | | IDAC | PPG |
| CONCEN-TRATION pH SOLUTION | Snow white | Futura gray | Red | White | Futura gray | White | Andalusian gray | Red 727 | Andalusian red | Vega green | Varnish | Priming light gray |
| Alkaline product PROGAL 131 R 1 g/l | D/E/S 1/1/80 | D/E/S 1/1/70 | D/E/S 1/1/90 | D/E/S 2/1/70 | D/E/S 2/1/60 | D/E/S 2/2/70 | D/E/S 2/2/60 | D/E/S 1/1/90 | D/E/S 1/1/90 | D/S 5/0 | D/S 3/0 | D/S 3/0 |
| PROGAL P 215 R 0.5 g/l aluminum salt pH of bath = 6 | 3/2/20 | 2/3/30 | 3/2/20 | 3/3/20 | 2/2/30 | 3/3/20 | 3/3/10 | 2/2/30 | 2/2/30 | 5/0 | 4/0 | 3/0 |
| Bentonite 1 g/l | 2/2/20 | 2/2/20 | 2/2/30 | 2/2/20 | 1/1/20 | 2/2/20 | 2/2/10 | 1/1/30 | 1/1/30 | 5/10 | 3/10 | 3/10 |

From examination of the values indicated for D, E and S in Tables II to V, it appears that:
- the denaturation agents according to the invention never lead to a settling of the water-dilutable paints, in contrast to the denaturation agents according to the prior art,
- in the case of the denaturation of solvent-based paints, settling when using compositions according to the invention is not observed,
- the denaturation of water-dilutable paints as well as the resistance to exudation of the pigments are more complete with the compositions according to the invention,
- the denaturation of solvent-based paints is as good with the compositions according to the invention as with the denaturation agents according to the prior art.

It follows that the denaturation agents according to the invention are usable for solvent-based paints as well as for water-dilutable paints.

Their universal character constitutes an important advantage.

We claim:

1. A process for denaturating water-dilutable paints and solvent-based paints comprising treating said paints by washing them with an aqueous denaturation phase or solution whose pH is from 4.5 to 7 and which contains an effective quantity of at least one denaturation agent comprising an amine molecule having the formula

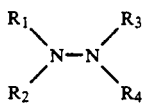

or the formula:

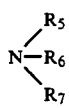

in which the substituents $R_1$ to $R_7$, which may be identical or different, denote:
- a hydrogen atom,
- a radical of formula —O—Re in which Re is selected from the group consisting of hydrogen and a $C_1$ to $C_4$ saturated aliphatic hydrocarbon chain, wherein the substituents $R_5$ to $R_7$ are not simultaneously all hydrogen atoms, or of a hydrate or else of an organic or inorganic acid salt of said amine molecule, and separating the denatured paint from said aqueous denaturation phase or solution.

2. A process according to claim 1, wherein the denaturation solution has a pH from 5 to 6.

3. A process according to claim 1, wherein the inorganic acid salt of said amine molecule of formula (I) or (II) is a salt of at least one of the acids of the group consisting of sulfuric, phosphoric or hydrochloric acids.

4. a process according to claim 1, wherein the aqueous denaturation solution has a concentration in at least one of the denaturation agents of formula (I) or (II) or in at least one of their hydrate or organic or inorganic acid salt between 0.1 and 50.0 g/l.

5. A process according to claim 1, wherein the aqueous denaturation solution has a concentration in at least one of the denaturation agents of formula (I) or (II) or in at least one of their hydrate or organic or inorganic acid salt between 1 and 6 g/l.

6. A process according to claim 1, wherein the denaturation solution comprises at least one additional denaturation agent from the group consisting of anti-foaming agents and microbicidal agents.

7. A process according to claim 1, wherein the denaturation solution comprises additional denaturation agents selected from the group consisting of polyelectrolytes (nonionic, anionic, cationic) and solutions of salts of trivalent metals selected from the group consisting of aluminum and iron.

8. A process according to claim 1, wherein the denaturation solution comprises antifoaming agents selected from the group consisting of oils of mineral, vegetable or animal origin, of lipophilic nonionic surfactants selected from the group consisting of alcohols or alkylphenols containing propylene oxide, and of the silicone-containing antifoaming agents.

9. A process according to claim 1, wherein the pH of the denaturation solution is brought to the value of 4.5 to 7 using a sufficient quantity of at least one of the products of the group consisting of sodium hydroxide, potassium hydroxide, the alkali metal carbonates, ammonia, the alkanolamines selected from the group consisting of monoethanolamine, diethanolamine, triethanolamine, the phosphates selected from the group consisting of trisodium and tripotassium phosphates, sodium pyrophosphate and tripolyphosphate and potassium pyrophosphate and tripolyphosphate, sulfuric acid, hydrochloric acid, phosphoric acid and nitric acid.

10. A process according to claim 1, wherein the pH of the denaturation solution is brought to a value of 4.5 to 7 using a mixture of two denaturation agents of formula (I) or (II), one of which is an acid compound and the other an alkali compound.

11. A process according to claim 1, wherein the denaturation solution has a pH from 5 to 6 and wherein the inorganic acid salt of said amine molecule of formula (I) or (II) is a salt of at least one of the acids of the group consisting of sulfuric, phosphoric or hydrochloric acids.

12. A process according to claim 1, wherein the denaturation solution comprises microbicidal agents selected from the group consisting of the precursors of formalin consisting of triazines, of the aldehydes consisting of glutaraldehyde, and of the derivatives of isothiazalone based on 2-octyl-4-itothiazolin-3-one.

* * * * *